United States Patent Office 3,784,586
Patented Jan. 8, 1974

3,784,586
COPOLYMERIZABLE COMPOSITION OF OLIGO-ESTERS HAVING MALEIC ACID END GROUPS AND VINYL MONOMERS
Philippe Thomas, Boulogne, Seine, and Jacques Meyer, Paris, France, assignors to Pechiney-Saint-Gobain, Neuilly-sur-Seine, France
No Drawing. Filed Oct. 26, 1970, Ser. No. 84,194
Claims priority, application France, Oct. 30, 1969, 6937328
Int. Cl. C08f 21/00
U.S. Cl. 260—861
19 Claims

ABSTRACT OF THE DISCLOSURE

A process for preparation of copolymerizable compositions comprising reacting maleic anhydride with one or more polyhydroxylated compounds in the ratio of 1 mole maleic anhydride per hydroxyl group of the polyhydroxylated compounds at a temperature within the range of 50–100° C. until a hydroxyl number of 20 or below is reached and thereafter adding at a temperature within the range of room temperature to 100° C. of at least one cross-linking vinyl monomer in the presence of a polymerization inhibitor.

---

This invention relates to the preparation of copolymerizable compositions based on oligoesters having maleic acid end-groups and cross-linking vinyl monomers and to compositions and methods for use in same.

It is known to prepare compositions based on:

(a) unsaturated polyesters, obtained by reaction between one or more dihydric alcohols (glycols) and fumaric acid and/or maleic acid and/or its anhydride possibly coupled with one or more other diacids and/or anhydrides, in which all acid functions are esterified by the alcohol functions, and (b) monomers having at least a vinylic function. These compositions are afterwards copolymerized through the medium of double bonds having a fumaric structure of the chain of said polyesters.

It is also known that a polyester, having double bonds with a maleic structure, obtained by carrying out the polycondensation at a temperature below 120° C., does not copolymerize with the cross-linking vinyl monomers and therefore are not of industrial interest.

The object of this invention is to provide easily copolymerizable compositions based on oligoesters having maleic acid end-groups as distinguished from polyesters having a fumaric structure, and which are able to copolymerize with the cross-linking vinyl monomers to produce a commercially desirable product.

By the terms oligoesters having maleic acid end-groups, reference is made to oligoesters which contain maleic groups, each of which has a free acid function.

The copolymerizable compositions, object of this invention comprise:

(a) one or more oligoesters with maleic acid end-groups resulting from the reaction of maleic anhydride with one or more polyhydroxylated compounds at the ratio of a mole of maleic anhydride per hydroxyl group of the polyhydroxylated compound or compounds.
(b) one or more cross-linking vinyl monomers and
(c) at least one polymerization inhibitor.

In such composition, the cross-linking vinyl monomer or monomers represent from 15 to 70% by weight, based on the composition, and the polymerization inhibitor or inhibitors represent from 30 to 300 p.p.m. based on the composition.

At ambient temperature, the copolymerizable compositions appear in the form of more or less viscous liquids to the form of solids.

The initial polyhydroxylated compounds contain at least two hydroxyl groups and are selected from, the saturated or unsaturated aliphatic alcohols, aromatic alcohols, cycloaliphatic alcohols. They can be substituted by alkyl, alkoxy groups, and/or halogen atoms and can also have in their molecule, one or more ester and/or ether and/or amide and/or urethane groups. Representative are: ethylene-glycol, propylene-glycol, 1,3-propanediol, 1,3-butanediol, 1,4-butanediol, 1,5-pentanediol, 1,6-hexanediol, trimethylolethane, hexanetriol, pentaerythritol, 2-ethyl- 1,3-hexyldiol, hydrogenated bisphenol A, monallylic ether of trimethylolpropane, ethylic and propylic ethers of bisphenol A, diethylene-glycol, dipropylene-glycol, polyoxypropylene-glycols, and more particularly 2,2,4-trimethyl-1,3 - pentanediol, neopentyl-glycol, trimethylol-propane, and glycerol.

The cross-linking vinyl monomers which are used in the compositions of this invention are of the type usually used in the preparation of polyesters. They must be solvents for the oligoester at a temperature which does not exceed 100° C. Used alone or in mixture, these monomers are represented by styrene, chlorostyrene, vinyltoluene, divinylbenzene, acrylates and methacrylates of lower alkyls of from 1–6 carbon atoms, vinyl acetate, vinyl propionate, vinyl pivalate, diallyl phthalate, triallyl cyanurate, 1,3-butanediol dimethacrylate and alkylvinyl-ethers.

The polymerization inhibitors, which ensure the conservation of said compositions, are selected from conventional inhibitors such as paratertiobutyl-catechol, hydroquinone monomethyl or monoethyl ether, benzoquinone, 2,5-tertiary-butyl hydroquinone, copper naphthenate and more particularly hydroquinone.

According to the method of preparation of the compositions of this invention, maleic anhydride is reacted with one or more polyhydroxylated compounds in the ratio of a mole of maleic anhydride per hydroxyl group of the polyhydroxylated compound or compounds at a temperature within the range of 50° C. to 100° C., until the reaction mixture has a hydroxyl number below or equal to 20. Thereafter, at a temperature between room temperature and 100° C., at least a cross-linking vinyl monomer and at least a polymerization inhibitor are added.

The polyhydroxylated compounds used correspond to those heretofore defined.

It is essential that the reaction temperature of the maleic anhydride with the polyhydroxylated compound not to exceed 100° C. in order to avoid the transposition from the maleic cis-form into the fumaric trans-form.

Being an addition reaction, there is no elimination of by-product and, consequently, a continuous production is easily realizable.

Although it is not necesary, it is advantageous to carry out the reaction in an atmosphere of inert gas, as by a flow of nitrogen, carbon dioxide, argon or helium, thus avoiding any discoloration.

The reaction time, which is a function of the nature of the polyhydroxylated compounds as well as reaction temperature, varies from 15 minutes to some hours and is determined by the value of the hydroxyl number desired to be obtained.

As described, the oligoesters obtained appear at room temperature, either in the form of more or less viscous liquids or in the form of solids, but they are all in the liquid state at 100° C.

The cross-linking vinyl monomers as well as the polymerization inhibitors are of the type previously defined.

The amounts of cross-linking vinyl monomers are dependent somewhat upon mechanical properties of the copolymerized compositions which are desired to be obtained. They are comprised between 15 and 70% by weight, based on the composition.

In order to ensure the preservation of the compositions, polymerization inhibitors are added simultaneously with the cross-linking vinyl monomers or after mixing the oligoesters with the cross-linking vinyl monomers.

These inhibitors are added to the compositions in proportions of between 30 and 300 p.p.m. by weight of the compositions. Thus the compositions may be kept for several months at room temperature before use.

The copolymerization is carried out by the presence of polymerization initiators, such as peroxides, more particularly benzoyl and cumyl peroxides, tertiary butyl and cumene hydroperoxdyes, tertiobutyl perbenzoate and catalytic couples, such as cumene hydroperoxide-vanadium salt. These initiators may be added before the intended copolymerization and preferably at the time of use of the compositions, in proportions between 0.1 and 5% by weight of the compositions.

In the case where use is not made of a chemical polymerization initiator, the copolymerization can be achieved by means of radiations, such as ultra-violet rays or accelerated electrons.

It is well known that it is possible to add to the compositions of this invention, conventional additives, such as powdered coloring agents, mineral or organic fillers, artificial, synthetic or natural fibers, such as glass fibers, asbestos fibers or cellulose fibers.

Furthermore this invention has as an object the use of the composition of the invention in the manufacture of paints, varnishes, adhesives, foams as also for the fabrication of moulded articles by compression or injection molding during which the copolymerization of the oligoesters and cross-linking vinyl conomers of said compositions is caused. Moreover, this invention has as an object the products obtainer after the copolymerization of said compositions.

The following examples are given by way of illustration of the invention and not by way of limitation.

EXAMPLE 1

The following are introduced at room temperature into a glass reactor, having a capacity of 2 liters, provided with an agitator, a thermometer, an upward directed condenser: 438 g. of 2,2,4-trimethyl-1,3-pentanediol and 588 g. of maleic anhydride.

A stream of nitrogen gas is bubbled through the reaction medium which is progressively heated to 80° C. This temperature is maintained for 4 hours to a hydroxyl number of 20. At this same temperature, 714 g. of styrene is added to the oligoester formed and the mixture is stabilized with 268 mg. of hydroquinone. The composition obtained is very fluid: 40 centipoises at 25° C.

On the composition obtained, the S.P.I. test of polymerization at 82° C. with 1% by weight of benzoyl peroxide is carried out with the following results. This test is described by A. L. Smith—Sec. 1, Sixth Annual Technical Session Reinforced Plastics Div. S.P.I. 1951:

Gel time _____min__ 6
Conversion time _____min__ 9
Maximum temperature _____° C__ 240

EXAMPLE 2

The oligoesters, prepared as in Example 1, is put in solution at room temperature in vinyl aceate in order to obtain a concentration of the oligoester in the solution of 66.6% by weight. 80 p.p.m. of hydroquinone, based on the solution, are added.

The polymerization of the composition obtained is achieved in the cool state in the course of about ten hours with 0.2% by weight of the composition of a vanadium solution with 3% of metal and 1% of cumene hydroperoxide.

The block obtained is quite hard. Owing to the fact that the composition copolymerizes at room temperature, it is not possbile to carry out the S.P.I. test.

EXAMPLE 3

The same oligoester as that of Example 1 is put in solution at 60% by weight in vinyl propionate. Hydroquinone is added at the rate of 80 p.p.m. based on the solution.

The S.P.I. test at 82° C. gives the following results:

Gel time _____min__ 13
Conversion time _____min__ 19
Maximum temperature _____° C__ 202

The mass obtained is hard and brittle.

EXAMPLE 4

An oligoester prepared as described in Example 1 is put into solution, at 55% by weight of the solution, in butyl acrylate. 80 p.p.m. by weight of hydroquinone, based on the solution, are added.

The results of the S.P.I. test are the following:

Gel time _____min__ 6
Conversion time _____min__ 7
Maximum temperature _____° C__ 188

The copolymerized product obtained is flexible.

EXAMPLE 5

60 parts of the oligoester of Example 1 is mixed with 40 parts of methyl methacrylate and 80 p.p.m. of hydroquinone, based on the mixture.

The S.P.I. test gives the following results:

Gel time _____ 6 min.
Conversion time _____ 11 min. 30 sec.
Maximum temperature _____ 150° C.

The mass obtained is flexible.

EXAMPLE 6

In the same apparatus as that of Example 1, 208 g. of neopentyl-glycol and 392 g. of maleic anhydride are introduced. The mixture is heated at 90° C. for 5 hours; the hydroxyl number is then of about 10.

After cooling at room temperature, a solid which melts at about 87° C. is obtained. 400 g. of styrene and 80 mg. of hydroquinone are added to the molten solid. A solution which is solidified at room temperature is obtained. The solid mixture becomes liquid when it is heated at about 40° C.

The S.P.I. test gives the following results:

Gel time _____min__ 5
Conversion time _____min__ 7
Maximum temperature _____° C__ 240

The product obtained is a rigid solid.

EXAMPLE 7

The method of Example 1 is followed with 268 g. of trimethylolpropane and 588 g. of maleic anhydride. The hydroxyl number of 20 is reached after 5 hours of heating at 80° C.

100 parts by weight of the oligoester obtained is mixed with 100 parts of n-butyl vinyl ether and 50 p.p.m. based on the mixture of hydroquinone.

The S.P.I. test is carried out on the composition obtained, which gives the following results:

Gel time _____ 1 min. 15 sec.
Conversion time _____ 3 min. 15 sec.
Maximum temperature _____ 171° C.

The copolymerized product obtained is flexible.

EXAMPLE 8

The operating method of Example 1 is repeated with 184 g. of glycerol and 588 g. of maleic anhydride. The hydroxyl number is of 20 after 8 hours of reaction at 80° C.

At room temperature, 100 parts by weight of the oligoester is mixed with 100 parts by weight of ethyl acrylate and 50 p.p.m., based on the mixture, of hydroquinone.

It is not possible to carry out the S.P.I. test because of the high exothermicity of the copolymerization of the composition.

This copolymerization is carried out at room temperature after addition of 0.2% by weight of a vanadium solution with 3% of metal and 1% by weight of cumene hydroperoxide. The gelation occurs after 3 hours. The product obtained is flexible.

It will be understood that changes may be made in the formulations and reaction conditions, without departing from the spirit of the invention, especially as defined in the following claims.

We claim:

1. A copolymerizable composition consisting essentially of
   (a) one or more oligoesters having terminal carboxylic acid groups formed by reaction of maleic anhydride with a polyhydroxylated compound selected from the group consisting of saturated and unsaturated aliphatic alcohols, aromatic alcohols, cycloaliphatic alcohols, alkyl-, alkoxy- and halogen-substituted derivatives thereof, and derivatives thereof which contain an ether, amide or urethane group, at a temperature of up to 100° C.,
   (b) one or more cross-linking vinyl monomers, and
   (c) a polymerization inhibitor to prevent copolymerization of the oligoesters with the vinyl monomer.

2. A composition as claimed in claim 1 in which the oligoester is formed by reaction of maleic anhydride with a polyhydroxylated compound in the ratio of one mole maleic anhydride per hydroxyl group of said polyhydroxylated compounds.

3. A composition as claimed in claim 1 in which the cross-linking vinyl monomer is present in an amount within the range of 15–70% by weight of the composition and the inhibitor is present in an amount within the range of 30–300 p.p.m. based on the weight of the composition.

4. A composition as claimed in claim 1 in which the polyhydroxylated compound is selected from the group consisting of 2,2,4-trimethyl, 1,3-pentanediol, neopentyl glycol, trimethylol propane and glycerol.

5. A composition as claimed in claim 1 in which the cross-linking vinyl monomers are selected from the group consisting of styrene, chlorostyrene, vinyltoluene, divinylbenzene, lower alkyl acrylates and methacrylates, vinyl acetate, vinyl propionate, vinyl pivalate, allyl phthalate, triallyl cyanurate, 1,3-butanediol dimethacrylate and alkylvinylethers.

6. A composition as claimed in claim 1 in which the polymerization inhibitors are selected from the group consisting of paratertiobutyl-catechol, hydroquinone monomethyl ether, hydroquinone monoethyl ether, benzoquinone, 2,5-tertiary-butyl hydroquinone, copper naphthenate and hydroquinone.

7. A process for preparation of compositions comprising reacting a reaction mixture consisting essentially of maleic anhydride with one or more polyhydroxylated compounds selected from the group consisting of saturated and unsaturated aliphatic alcohols, aromatic alcohols, cycloaliphatic alcohols, alkyl-, alkoxy- and halogen-substituted derivatives thereof, and derivatives thereof which contain an ether, amide or urethane group in the ratio of 1 mole maleic anhydride per hydroxyl groups of the polyhydroxylated compounds at a temperature within the range of 50–100° C. until a hydroxyl number of 20 or below is reached and thereafter adding at a temperature within the range of room temperature to 100° C. for at least one cross-linking vinyl monomer in the presence of a polymerization inhibitor.

8. The process as claimed in claim 7 in which the cross-linking vinyl monomers are added in an amount within the range of 15 and 70% by weight based on the compositions and the polymerization inhibitors are present in an amount within the range of 30 to 300 p.p.m. by weight, based on the composition.

9. The process as claimed in claim 7 in which the polyhydroxylated compounds are selected from the group consisting of 2,2,4-trimethyl, 1,3-pentanediol, neopentylglycol, trimethylolpropane and glycerol.

10. The process as claimed in claim 7 in which the preparation of oligoesters is carried out in an atmosphere of inert gas.

11. The process as claimed in claim 10 in which the inert gas is selected from the group consisting of carbon dioxide, argon, helium and nitrogen.

12. The process as claimed in claim 7 in which the cross-linking vinyl monomers are solvents of oligoesters at a temperature which does not exceed 100° C.

13. The process as claimed in claim 7 in which the cross-linking vinyl monomers are selected from the group consisting of styrene, chlorostyrene, vinyltoluene, divinylbenzene, lower alkyl acrylates and methacrylates, vinyl acetate, vinyl propionate, vinyl pivalate, allyl phthalate, triallyl cyanurate, 1,3-butanediol dimethacrylate and alkyl vinyl ethers.

14. The process as claimed in claim 7 in which the polymerization inhibitors are selected from the group consisting of paratertiobutyl-catechol, hydroquinone monomethyl ether, hydroquinone monoethyl ether, benzoquinone, 2,5-tertiary-butyl hydroquinone, copper naphthenate and hydroquinone.

15. The process for preparation of the copolymerization product comprising copolymerizing the composition of claim 1 in the presence of an initiator.

16. The process for preparation of the copolymerization product comprising copolymerizing the composition of claim 1 in the presence of radiations.

17. A composition as claimed in claim 1 wherein the polyhydroxylated compound is selected from the group consisting of ethylene glycol, propylene glycol, 1,3-butanediol, 1,4-butanediol, 1,5-pentanediol, 1,6-hexanediol, trimethylolethane, hexanetriol, pentaerythritol, 2-ethyl-1,3-hexyldiol, hydrogenated bisphenol A, monallylic ether of trimethylolpropane, ethylic and propylic ethers of bisphenol A, diethylene glycol, dipropylene glycol, polyoxypropylene glycols, 2,2,4-trimethyl-1,3-pentanediol, neopentyl glycol, trimethylolpropane and glycerol.

18. A composition as claimed in claim 1 wherein maleic anhydride is reacted with the polyhydroxylated compound to produce the oligoester having a hydroxyl number up to 20.

19. The process as claimed in claim 7 wherein the polyhydroxylated compound is selected from the group consisting of ethylene glycol, propylene glycol, 1,3-butanediol, 1,4-butanediol, 1,5-pentanediol, 1,6-hexanediol, trimethylolethane, hexanetriol, pentaerythritol, 2-ethyl-1,3-hexyldiol, hydrogenated bisphenol A, monallylic ether of trimethylolpropane, ethylic and propylic ethers of bisphenol A, diethylene glycol, dipropylene glycol, polyoxypropylene glycols, 2,2,4-trimethyl-1,3-pentanediol, neopentyl glycol, trimethylolpropane and glycerol.

References Cited
UNITED STATES PATENTS

| | | | |
|---|---|---|---|
| 2,813,055 | 11/1957 | Nischk et al. | 154—140 |
| 3,373,144 | 3/1968 | Janssen et al. | 260—75 |
| 3,466,264 | 9/1969 | Hagemeyer et al. | 260—75 |

(Other references on following page)

UNITED STATES PATENTS

| | | | |
|---|---|---|---|
| 3,455,801 | 7/1969 | D'Alelio | 204—159.19 |
| 2,891,989 | 6/1959 | Petras | 260—485 |
| 2,978,395 | 4/1961 | Hollyday et al. | 204—154 |
| 3,551,311 | 12/1970 | Nass et al. | 204—159.18 |

OTHER REFERENCES

Boeing, "Unsaturated Polyesters" Elsevier 1964, pp. 10–13, 35–37, 77–78, 102–106, 134–135.

Funke et al., "Influence of Degree of Isomerization of Unsaturated Polyesters on the Course of Copolymerization with Styrene" Die Makromolecular Chemie 50, 188–195 (1961).

WILLIAM H. SHORT, Primary Examiner

E. A. NIELSEN, Assistant Examiner

U.S. Cl. X.R.

204—159.15; 260—870, 86.1 R, 86.7